United States Patent [19]
Buttgereit et al.

[11] Patent Number: 5,692,704
[45] Date of Patent: Dec. 2, 1997

[54] BODY TAIL UNIT FOR A COMMERCIAL AIRCRAFT

[76] Inventors: Volker Buttgereit; Joachim Hempel; Burckhard Kiekebusch; Wolfram Schoene, all of c/o Daimler Benz Aerospace Airbus GmbH, Patent Dept., 21129 Hamburg, Germany

[21] Appl. No.: 485,103

[22] Filed: Jun. 7, 1995

[51] Int. Cl.$^6$ .................................................. B64C 1/26
[52] U.S. Cl. .................................. 244/119; 244/130
[58] Field of Search ...................... 244/117 R, 119, 244/87, 130, 48

[56] References Cited

U.S. PATENT DOCUMENTS

| | | | |
|---|---|---|---|
| 2,630,986 | 3/1953 | Gumbs | 244/48 |
| 2,874,922 | 2/1959 | Whitcomb | 244/130 |
| 3,677,502 | 7/1972 | Tupolev et al. | 244/119 |
| 3,756,529 | 9/1973 | Backlund et al. | 244/87 |
| 4,387,866 | 6/1983 | Eickmann | 244/48 |
| 4,674,712 | 6/1987 | Whitener et al. | 244/119 |
| 4,712,751 | 12/1987 | Hirschel . | |
| 4,953,812 | 9/1990 | Van der Hoeven | 244/119 |

FOREIGN PATENT DOCUMENTS

| | | | |
|---|---|---|---|
| 56929 | 12/1992 | Australia | 244/48 |
| 3526472C2 | 2/1987 | Germany . | |

OTHER PUBLICATIONS

British Magazine "Flight" Jan. 2, 1982 pp. 16, 17.
German Magazine "Flugrevue" Dec. 1970, pp. 28, 29.

*Primary Examiner*—Galen L. Barefoot
*Attorney, Agent, or Firm*—W. G. Fasse; W. F. Fasse

[57] ABSTRACT

In a tail unit for a commercial aircraft having a pressurized cabin, the trimmable elevator assembly and the rudder assembly are connected to a shortened fuselage tail section. The fuselage tail section is shortened because at least the upper contour line of the tail section and the two lateral contour lines of the tail section each have at least one curvature reversal point in the outer contour. Additionally, the center box (23) of the elevator assembly passes through the tail section (16) in the area of the tail ribs (20, 22) which support the rudder assembly. This shortening of the tail section allows better utilization of the cabin space in the aircraft. Additionally, it reduces the aerodynamic drag and the total weight of the tail unit.

9 Claims, 6 Drawing Sheets

BODY TAIL UNIT FOR A COMMERCIAL AIRCRAFT

FIELD OF THE INVENTION

The invention relates to a tail unit for a body of a commercial aircraft having a pressurized cabin in the aircraft body. Such tail units comprise two elevators referred to as the elevator assembly and a rudder assembly directly connected to form the tail unit. The stabilizing fin or tab of the elevator assembly is trimmable.

BACKGROUND INFORMATION

The outer contour of an aircraft body is determined primarily with due regard to aerodynamic considerations. As a result, the possibilities of constructing the supporting structure and the arrangement of individual equipment components of the aircraft are limited by the outer body configuration of the aircraft. In connection with aircraft constructions in which the elevator and rudder assemblies are directly connected to the tail unit, the entire tail section of the aircraft has its special problems. On the one hand, it is necessary to provide a rudder or elevator assembly with a defined outer assembly configuration and to provide the tail unit with a respective configuration in order to realize an efficient operation of the respective assembly. On the other hand, it is necessary to mount in a limited space all elements required for the transmission of the respective forces and for assuring the respective system function, including the function of the elevator assembly.

Conventional solutions for the construction of the aircraft tail unit have thus led to compromise solutions between what is aerodynamically required and what is practically feasible with regard to the structural and system related limitations. A further consideration for the construction and design of an aircraft tail unit is the fact that the tail unit as such is part of the aircraft body whereby the tail unit is not optimally usable for the installation of passenger seats and/or the loading of pieces of freight. For this reason the tail unit should be as short as possible in order to save weight.

Due to structural considerations, it is customary that in conventional aircraft the center box of the elevator assembly passes through the tail unit behind the area of the body ribs to which the rudder assembly is connected so that the tail assemblies are decoupled from each other. One such construction is described in the British Magazine "Flight", Jan. 2, 1982, pages 16 and 17. In that known construction the rudder assembly of the aircraft takes up a position which does not provide the optimal length of the mechanical advantage or lever arm about the aircraft center of gravity. Nevertheless, the illustrated position of the rudder assembly provides advantages with regard to the trimmable elevator assembly. In order to achieve a satisfactory effectiveness of the rudder assembly nevertheless, the rudder assembly has a more pronounced sweepback and additionally has a relatively large surface area. A thus enlarged rudder assembly requires a relatively large profile thickness in order to take up the respective static bending forces. Thus, in the conventional construction illustrated in the above mentioned publication "Flight" the required efficacy or effectiveness of the rudder assembly is bought by features which increase the weight and the drag of the rudder assembly.

The fin root fillet between the body and the rudder assembly is formed by a sharp edged concave gusset. Such a nonsmooth or stepped transition is not considered to be optimal with regard to aerodynamic considerations. Another disadvantage of the just described solution which is exemplary for the prior art, is seen in that the tail unit due to its relatively slender configuration takes up a relatively large proportion of the entire body length of the aircraft. Due to this slenderness that has been selected for aerodynamic reasons, the tail unit is not amenable to increasing the size of the passenger cabin when the entire aircraft body length is fixed, because it is not possible to shift back the rear pressure bulk head. Further, the tail unit can also not be shortened by the above conventional teaching.

A German Magazine "Flugrevue", December 1970, shows on pages 28 and 29 another body tail unit to which the elevator assembly and the rudder assembly are connected, whereby the stabilizing fin of the elevator assembly is also trimmable. However, in the just described conventional construction a jet propulsion plant or engine is arranged between the root of the rudder assembly and the tail section so that there is a spacing between the root of the rudder assembly and the tail section. This spacing depends on the outer diameter of the propulsion plant housing forming a tail. As a result, the rudder assembly appears to be displaced upwardly by the outer diameter of the tail cone. The transmission of the rudder assembly forces takes place in that the spars of the rudder assembly are connected to ribs arranged inside the engine housing. These ribs in turn are connected to respective ribs of the aircraft tail unit. In the just described conventional construction the center box of the elevator assembly is not arranged behind the tail unit ribs, but passes through the tail unit ribs to which the rudder assembly is connected. Although this measure could as such provide an advantage regarding the leverage of the rudder assembly, this advantage is nullified again due to the upward displacement of the rudder assembly. Thus, the just described construction is not optimal regarding the weight and drag of the rudder assembly.

Other conventional aircraft of the type relevant here, comprise mounting hardware in the fin root fillet area between the aircraft body and the rudder assembly. These mounting hardware components are arranged for achieving optimal static conditions in such a way that the hardware components extend outside the outer contour of the fin root fillet area so that respective cowling is necessary. As a result, the projections formed by the cowling in the area of the mounting hardware components cause an increase in the air drag. Such cowlings so far have served only for the purpose of adapting the outer configuration of the respective wall area of an aircraft to the aerodynamic requirements. As a result, these cowlings do not contribute to the mechanical strength of the respective structural components.

The tapering of the aircraft body cross-section toward the tip of the tail unit is always present due to aerodynamic considerations. The tapering causes a divergence of the streamlines in the area of the tail unit. The divergence in turn entails an increased tendency of the flow to separate itself from the outer surface of the aircraft body. Such separation is undesirable. Due to the more or less pronounced upsweep of the tail unit the separation phenomena occur predominantly at the respective underside of the tail unit.

German Patent Publication DE 3,526,472 C2 shows a modification of an aircraft tail unit having an upsweep unit cross-sectional configuration deviating from a circular cross-section. The just mentioned German Patent Publication suggests that the surface or aerial center of gravity of the cross-sections of the tail ribs which as such are circular, is displaced downwardly so that vaultings are formed on the underside of the tail unit cross-section while maintaining the upper and both lateral contours unchanged. The just described conventional measures displace the flow separation point along the underside of the tail unit from its previous position to a position further downstream, whereby a reduction of the drag is achieved. German Patent Publication DE 3,526,472 C2 does not make any suggestions regarding the shortening of the tail unit relative to the entire aircraft body length, nor does it make any suggestions regarding the advantageous arrangement of the elevator assembly in the tail unit.

OBJECTS OF THE INVENTION

In view of the above it is the aim of the invention to achieve the following objects singly or in combination:

- to construct an aircraft tail unit in such a way that the tail unit length is shortened compared to the length of conventional tail units;
- to construct the tail unit in such a way that its rudder assembly can be smaller and lighter, yet fully effective for its intended purpose;
- to minimize flow separation and displace any remaining flow separation optimally backward in the flow direction toward the end of the tail unit;
- to position the elevator assembly in such a way in the tail unit that a more efficient space utilization can be achieved which permits shifting the rear pressure bulkhead backward to increase the cabin space; and
- to construct the tail unit in such a way that the so-called interference drag is substantially reduced and so that the weight of the tail section is reduced.

SUMMARY OF THE INVENTION

The tail unit or tail construction according to the invention is characterized in that at least an upper contour line and two lateral contour lines of the tail section forming part of the tail construction each have a respective slope reversing point or curvature reversing point in their continuity and in that these reversing points are positioned in the area of the tail section where the elevator assembly and the rudder assembly are connected to the tail section.

Such a construction has several special advantages. First, a better space utilization of the aircraft body or fuselage is achieved. Second, simultaneously a reduction in the tail unit drag is assured. Third, the tail unit weight and the tail section length are reduced compared to conventional tail structures.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
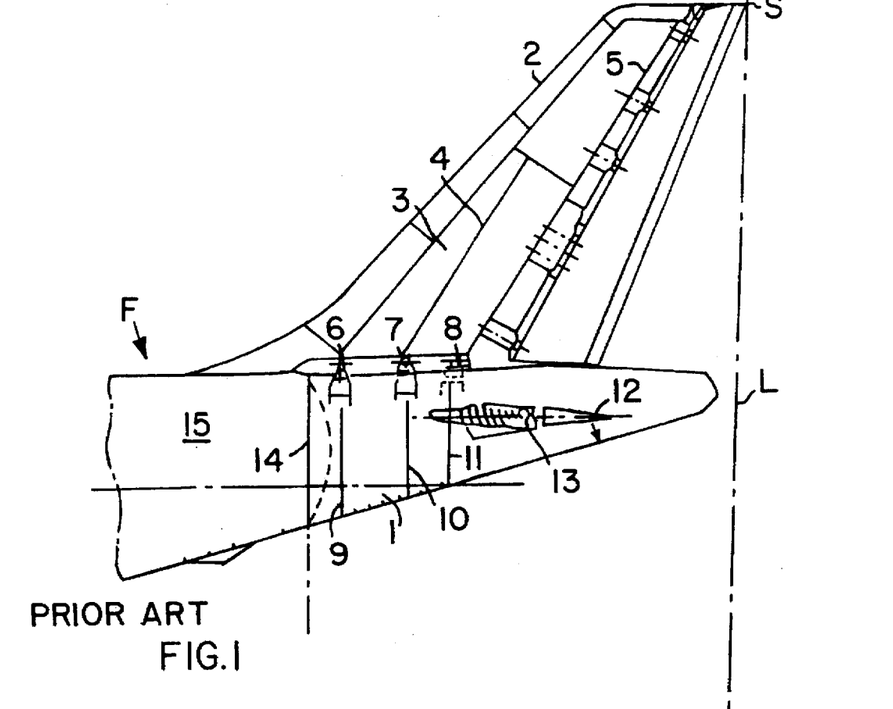
FIG. 1 shows a side view of a conventional tail unit of an aircraft body only the tail end of which is shown.

FIG. 1 shows a conventional tail unit or tail construction including a tail section of an aircraft body or fuselage F. Only a portion 15 of the aircraft body is shown. The tail construction further includes a rudder assembly 2 mounted to the top of the aircraft tail unit section 1. The rudder assembly 2 comprises spars 3, 4, and 5 which are secured through mounting brackets 6, 7, and 8 to tail ribs 9, 10 and 11 in the tail section 1. The contour line 12 shows the position of the center box 13 of the elevator assembly which also forms part of the tail construction. The elevator center box 13 passes through the tail section 1 at a position located behind or downstream of the last tail rib 11 of the group of tail ribs 9, 10, and 11. The terms behind or downstream and forward or upstream in this context have reference to the nose and tail end of the aircraft body. A compression rib or rear pressure bulkhead 14 is so positioned upstream of the tail rib 9 that it closes the aircraft cabin in the body portion 15.

Figure 2:
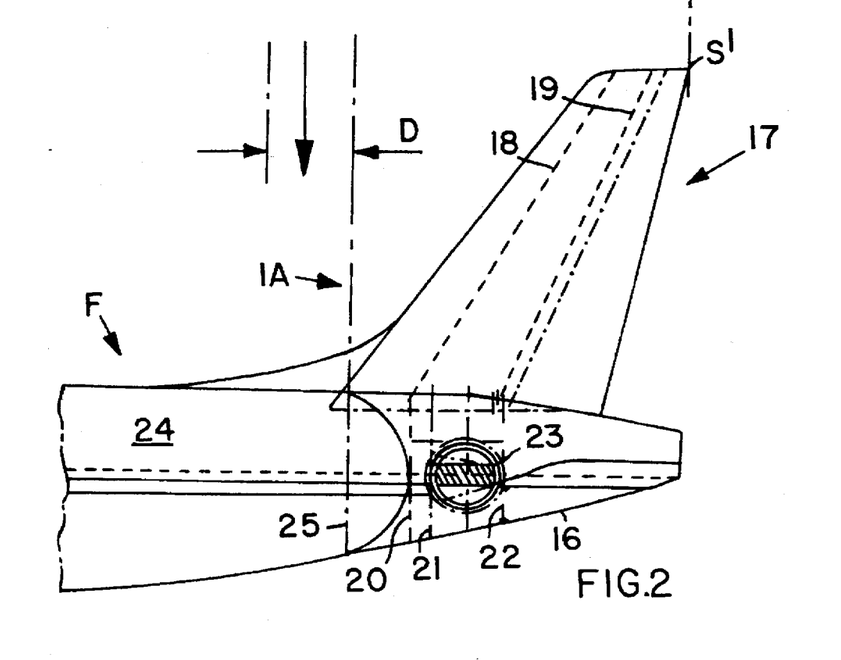
FIG. 2 is a view as in FIG. 1, however showing a tail unit according to the invention.

FIG. 2 shows a side view of the tail unit 16 according to the invention wherein a shorter aircraft body nevertheless provides more space for the cabin 24 due to the present construction of the tail unit. The tail unit 16 comprises a rudder assembly 17 and an elevator assembly not shown in FIG. 2 except for a center box 23. The rudder assembly 17 comprises longitudinal spars 18 and 19 connected to tail ribs 20 and 22. An auxiliary rib 21 is arranged between the main ribs 20 and 22 of the tail unit 16. The center box 23 of the elevator assembly 17 passes through the tail unit 16 in the area of the tail ribs 20 to 22. The pressurized cabin 24 is closed off rearwardly by a compression rear bulkhead 25. The tail unit 16 according to the invention replaces the tail section 1 shown in FIG. 1, whereby other conventional features of the aircraft body F remain undisturbed. The dash-dotted line L which connects the upper corners S and S' of the rudder assemblies 2 and 17 indicates that the X-coordinates of both points S and S' have the same distance from the respective coordinates of the corresponding body nose, not shown. However, the connecting area or zone of the rudder assembly 17 according to the invention to the tail unit 16 is clearly displaced rearwardly compared to the conventional construction shown in FIG. 1. This rearward displacement of the connection of the rudder assembly 17 to the tail section according to the invention provides the following possibilities regarding the interior and exterior geometries of the entire tail unit 16. First, the compression rib or rear bulkhead 25 that closes off the rear of the aircraft cabin 24 can be displaced rearwardly toward the tail tip. This feature has the advantage that additional rows of seats can be installed in the cabin 24 in an aircraft of sufficient size to provide the necessary body cross-sectional area. Second, the rudder assembly 17 can now be smaller, or rather have a smaller control surface with a smaller sweepback. This feature has the advantage that the structural weight is reduced and that the drag of the tail unit 16 is reduced. Third, the cross-sectional shape of the tail unit can now have new configurations with due regard to aerodynamic considerations.

The extent to which the compression rib or rear bulkhead 25 may be displaced rearwardly toward the tip of the tail unit 16 and thus the extent of the effect of such displacement on the geometry of the cabin 24 is illustrated by the distance D shown in FIG. 2. The center box 23 is mounted within the tail unit structure for tilting about a cross-axle for permitting the trim function. The introduction of the forces exerted by the elevator assembly, into the tail unit 16 takes place through the ribs 21 and 22. A suitable tiltable connection between the tail section 16 and the center box 23 comprises, for example, a pivot or journal junction with a respectively oriented journal axis and is connected to the tail unit 16. The introduction of the trimming motion thereby takes place through a self-locking or self-braking drive mechanism not shown, such as an adjustment strut. One strut end is operatively connected to the center box 23 in an area remote from the pivot or journal junction while the other strut end or drive rod end is connected to a fixed point of the tail unit 16. The tilting drive may be accomplished, for example by a spindle drive. In order to assure an unimpeded trim motion of the stabilizer fin, trapezoidal openings or cut-outs are required in the lateral shells of the tail unit 16. These lateral cut-outs or openings in turn are covered by gap covers in the form of elastic or rigid cover plates that are connected to the center box 23 and tiltable with the center box.

Figure 3:
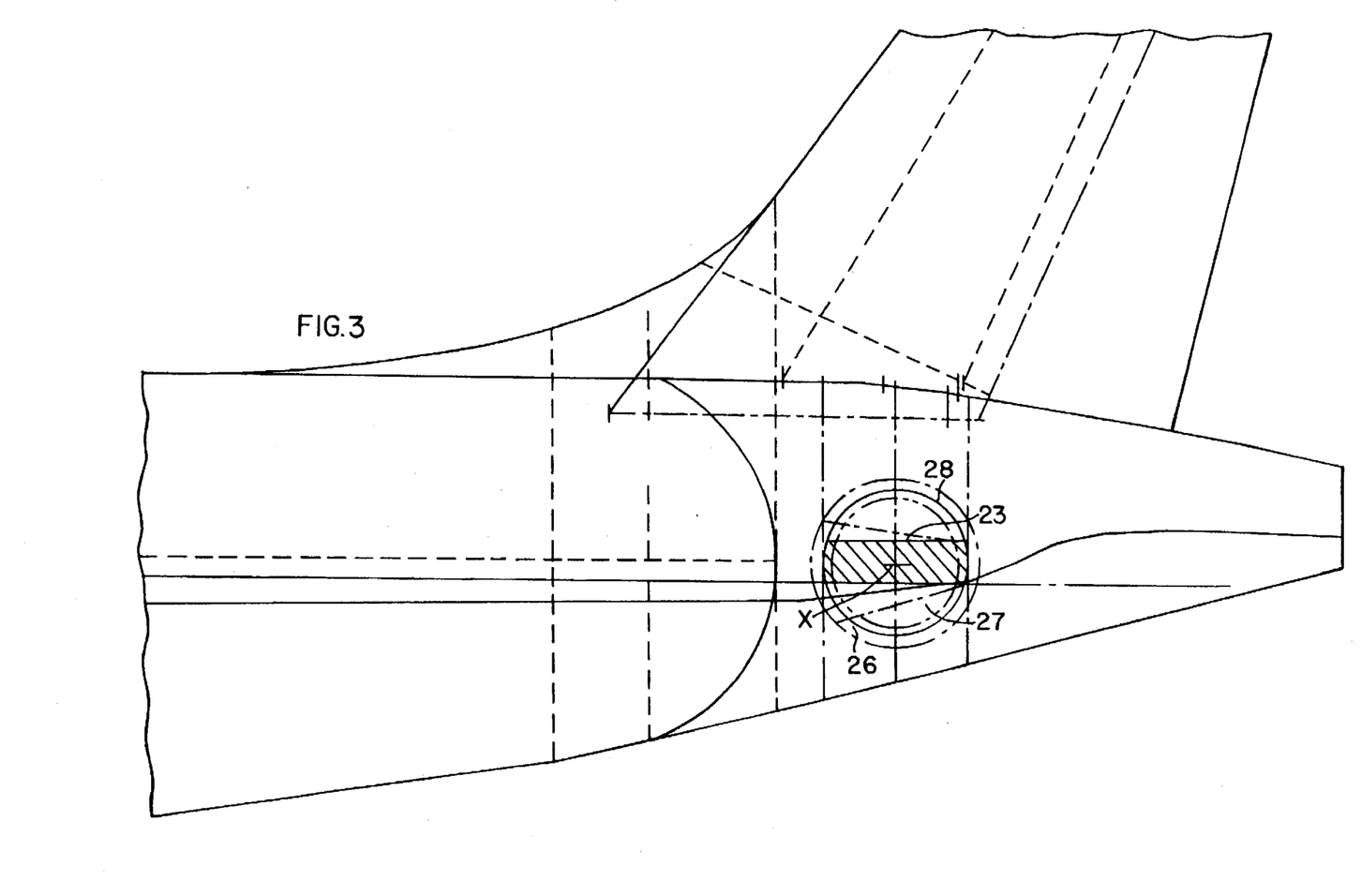
FIG. 3 is a view similar to that of FIG. 2 showing on enlarged scale a tail unit according to the invention with a tubular stiffening brace.

FIG. 3 shows an embodiment of the journal or pivot connection for the center box 23. This connection comprises a tubular stiffening bracket 26 arranged crosswise to the tail unit 16. A tilting element 27 with the center box 23 is mounted on or supported by the stiffening tubular bracket 26. This feature assures that in the short tail unit 16 according to the invention the forces that are effective within a relatively small volume can be completely controlled. Another advantage of this construction is seen in that the respective motion gap 28 is positioned on a cylinder surface around the tilting axis X that extends perpendicularly to the plane of the drawing sheet of FIG. 3. This fact has the further advantage that problems in connection with the covering of gaps can be easily solved by respective cover plates or shields that are so contoured that surfaces of these cover plates or shields are integrated into the contour of the tail unit. Suitable bearings for the tubular bracket 26 may be slide bearings or roller or ball bearings having a suitable diameter. Drive means for performing the trim motion are preferably selected for their ability to provide a rotary motion. Thus, electric motors or hydraulic motors are preferred.

In determining the aerodynamic contour of aircraft body configurations one endeavors to influence the characteristic of the aircraft configuration by suitably streamlining the body contour. In this connection it is an important aim to reduce the interference drag of aerodynamic structural components, such as a body/wing arrangement. The interference drag is the difference of the measured total drag and the calculated sum of the individual drags, such as of the body and of the wings. In the case of a tail unit comprising directly connected elevator assemblies and a rudder assembly, such reducing of the interference drag is especially important.

In order to avoid any effects that might impair the aerodynamic characteristic of the tail unit 16 due to the rearward displacement of the rudder assembly according to the invention, the invention provides that the tail unit 16 has a specially streamlined contour that forms a new external tail unit geometry.

Figure 4:
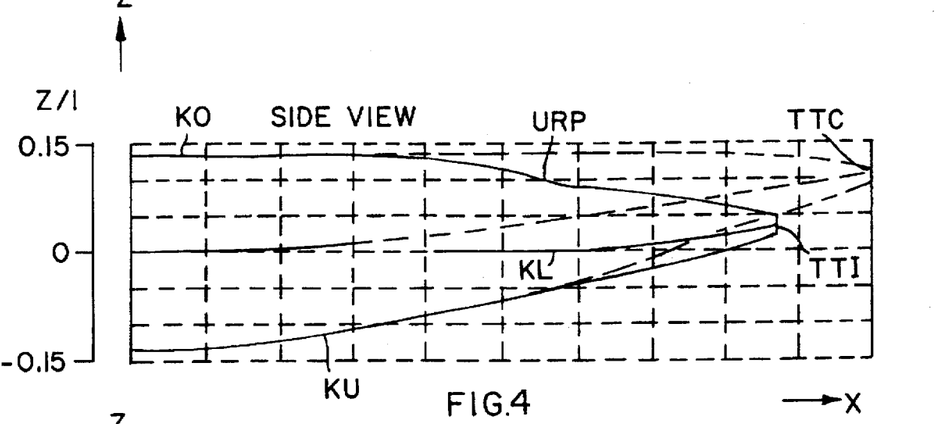
FIG. 4 is a graph wherein the full line illustrates the side contour or view of a tail unit according to the invention while the dashed line shows a tail unit of conventional construction for comparing.
Figure 5:
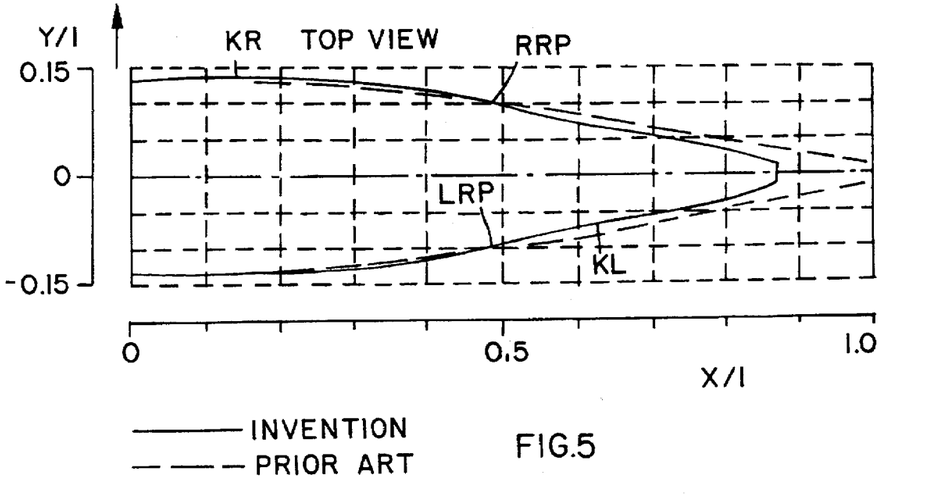
FIG. 5 is a graph similar to that of FIG. 4, however, showing a top view of the respective contours for comparing.

FIGS. 4 and 5 show the new external tail unit geometry according to the invention which will now be compared with a conventional unit with the help of a standardized illustration. For this standardized illustration the conventional tail unit has the length $x/l=1$. In FIGS. 4 and 5 the contour lines of the tail unit 16 according to the invention are shown by full lines while the respective contour lines of the conventional tail unit 1 are shown by dash-dotted lines. Moving from left to right along the abscissa, a reduction in the cross-sectional area of the present tail unit 16 is noted at the value $x/l=0.4$ as compared to the conventional tail unit. In the area of about $x/l=0.4$ to $0.6$, the reduction rate of the cross-sectional area is then more rapid than in the conventional tail unit. Following the value $x/l=0.6$, the reduction rate is again smaller. Due to this change in cross-sectional area in the tail unit according to the invention, one achieves at least the upper contour line KO and two lateral contour lines KL and KR each exhibiting a reversing point in the respective contour, namely an upper reversing point URP in the upper contour line KO, a right reversing point RRP in the right lateral contour line KR and a left reversing point LRP in the left lateral contour line KL. A reversing point in this context is defined as a change in the contour line or curve from a positive value to a negative value or vice versa. Viewing FIGS. 2, 4 and 5 in conjunction, the reversing points URP, RRP and LRP are positioned according to the invention in areas of the tail section 16 where the rudder and elevator assemblies are connected to the tail section.

Another characteristic feature of the tail configuration according to the invention resides in the fact that the projection of the lateral contour lines KL and KR approximately starting at the value $x/l=0.3$ is curved convexly in a downward direction. Due to this feature it is possible to make the new tail unit about twelve percent shorter than a conventional comparable tail unit without entailing any aerodynamic disadvantages. This advantageous length reduction of the tail unit 16 according to the invention becomes apparent in that the end or tip of the tail unit is now located approximately at the position $x/l=0.88$ in the diagram of FIGS. 4 and 5. The tail configuration according to the invention having said reversing points is achieved as the result of a systematic streamlining and contouring of the tail units. The sufficiently upwardly directed path of the lower contour line KU satisfies the requirement that during the rotation occurring when the aircraft lifts its nose as a result of take off, a sufficient ground clearance must be assured. The downward displacement of the tip TTI of the tail unit 16 of the invention as compared to the conventional tail tip TTC as shown in FIG. 4 is a result of aerodynamic considerations. This feature of the tail unit 16 according to the invention does not have any adverse effect on the rotation attitude at take off because the present tail tip TTI is still positioned outside of the area that is critical for the rotation.

Figure 6:
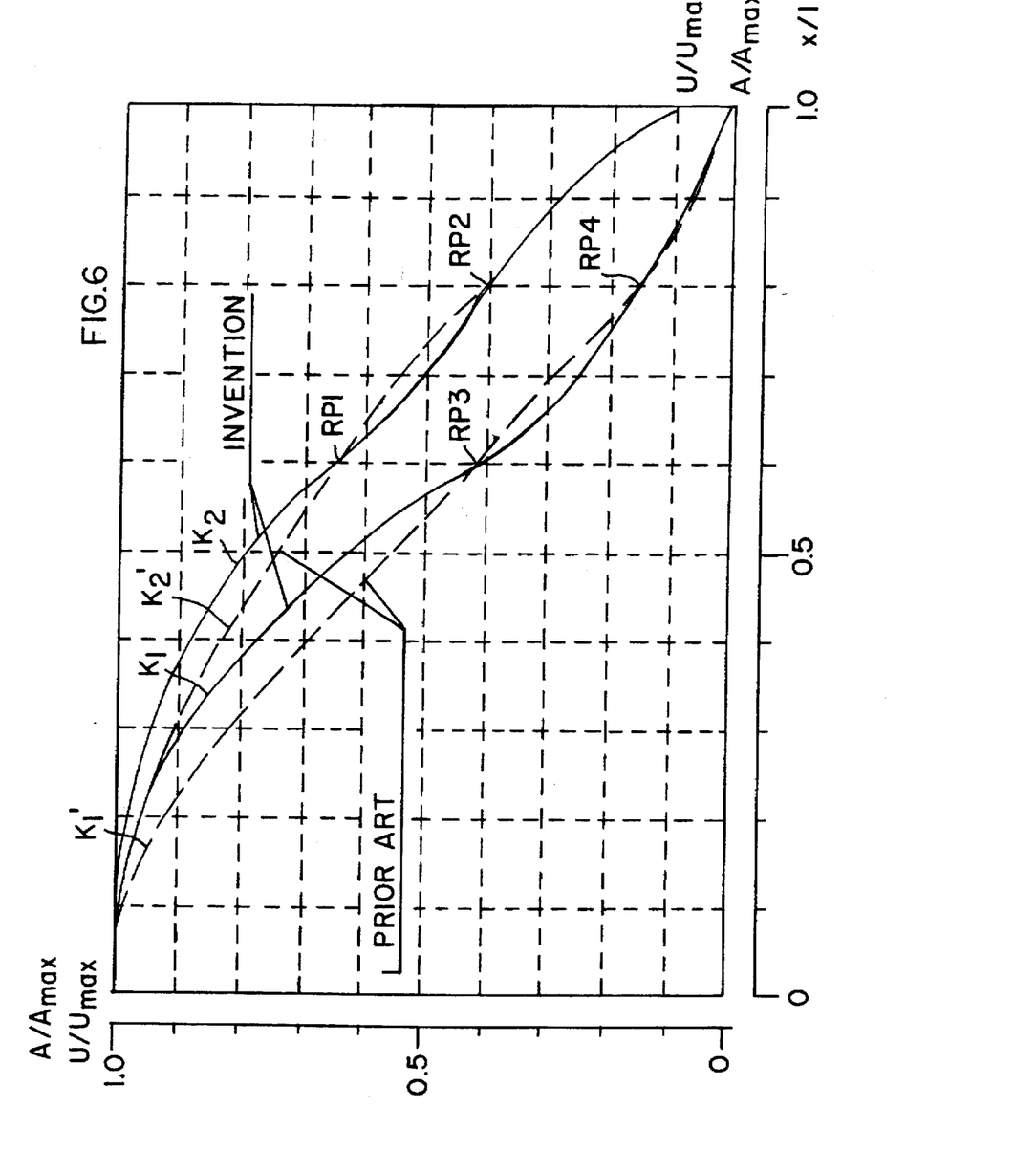
FIG. 6 shows curves of the cross-sectional area distribution and the circumferential distribution along the standardized length of a tail unit according to the invention and of a conventional tail unit.

FIG. 6 shows a diagram of dashed line curves K1' and K2' for a conventional tail unit 1 and full line curves K1 and K2 for the tail unit 16 according to the invention illustrating the area ratios $A/A_{max}$ and the circumferential ratios $U/U_{max}$ as distributed along the standardized length $x/l$ of a tail unit 1 or 16. The ratio $A/A_{max}$ is a standardized ratio of the cross-sectional area of sequential slices through the tail unit. The ratio $U/U_{max}$ is a corresponding standardized ratio of the circumference of the just mentioned slices. Both ratios are shown as a function of a standardized tail unit length x/l plotted along the abscissa. The full line curves K1 and K2 represent the tail unit 16 according to the invention. The dashed line curves K1' and K2' represent a tail unit 1 according to the prior art. It will be noted that the full line curves have reversing points RP1, RP2, RP3 and RP4 defined as set forth above. Curve K1 represents the cross-sectional area distribution. The respective lengths of the tail units are so normalized that the end of a conventional tail unit and the end of the tail unit according to the invention are located at x/l=1, see the lower right-hand corner of FIG. 6. The dashed line curves K1' and K2' are relatively straight. Contrary thereto the full line curves K1 and K2 each have the above mentioned reversing points RP1 and RP3 approximately at x/l=0.6. The zone in which the reversing points RP1 and RP3 are located is preferably within the range of 0.5<x/l<0.7. The further transition or reversing points RP2 and RP4 are located approximately at x/l=0.8.

Figure 7:
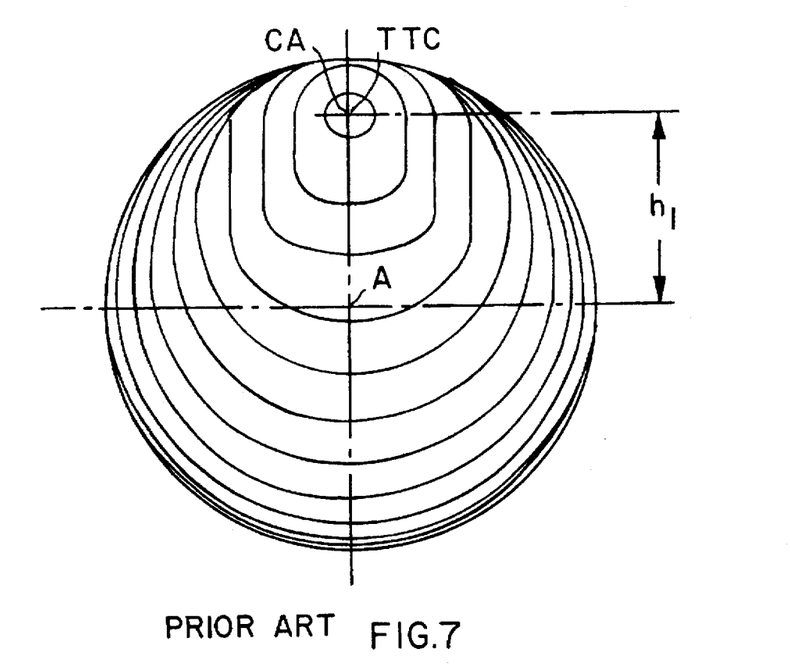
FIG. 7 is a skeleton view of the ribs of a conventional tail unit as viewed forward substantially in the longitudinal direction of the aircraft axis.

FIG. 7 shows a skeleton diagram for a conventional tail unit 1. The longitudinal aircraft axis A passes centrally through the shown coordinate system and perpendicularly to the plane of the drawing. The individual ribs are substantially circular except toward the conventional tail tip TTC. The central axis CA of the tail tip is spaced by a spacing $h_1$ from the aircraft axis A. The lateral flattening of the shear lines closer toward the tail tip TTC are intended to facilitate the attachment of the trimmable elevator assembly.

Figure 8:
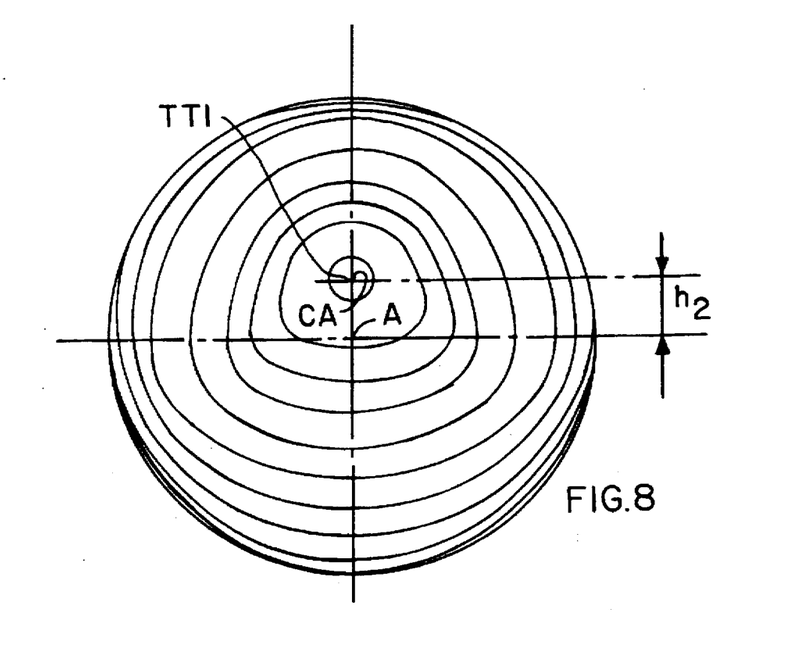
FIG. 8 is a skeleton view of the ribs of a tail unit according to the invention with the same view direction as in FIG. 7 illustrating the lowering of the tail tip.

FIG. 8 is a view similar to that of FIG. 7, however showing a skeleton diagram of a tail unit 16 according to the invention secured to an aircraft body also having a substantially circular cross-section as in FIG. 7. It will be noted that the spacing $h_2$ between the aircraft axis A and the central axis CA of the tail tip is substantially smaller than $h_1$. The configuration of the individual ribs as the tail unit is so constructed that the respective meridian extends close to or below the aircraft axis A, whereby the rib cross-sections on the underside of the present tail unit 16 are flattened to approximate almost a straight line, especially toward the central vertical plane through the aircraft. Further according to the invention the rib configurations in the tail unit 16 of the invention are not limited to any particular geometry. Rather, these geometries may be determined with due regard to practical considerations. However, it is important that the above described reversing point RP1 to RP4 be achieved in the cross-sectional distribution and in the circumferential distribution along the length of the tail unit.

Figures 9, 10:
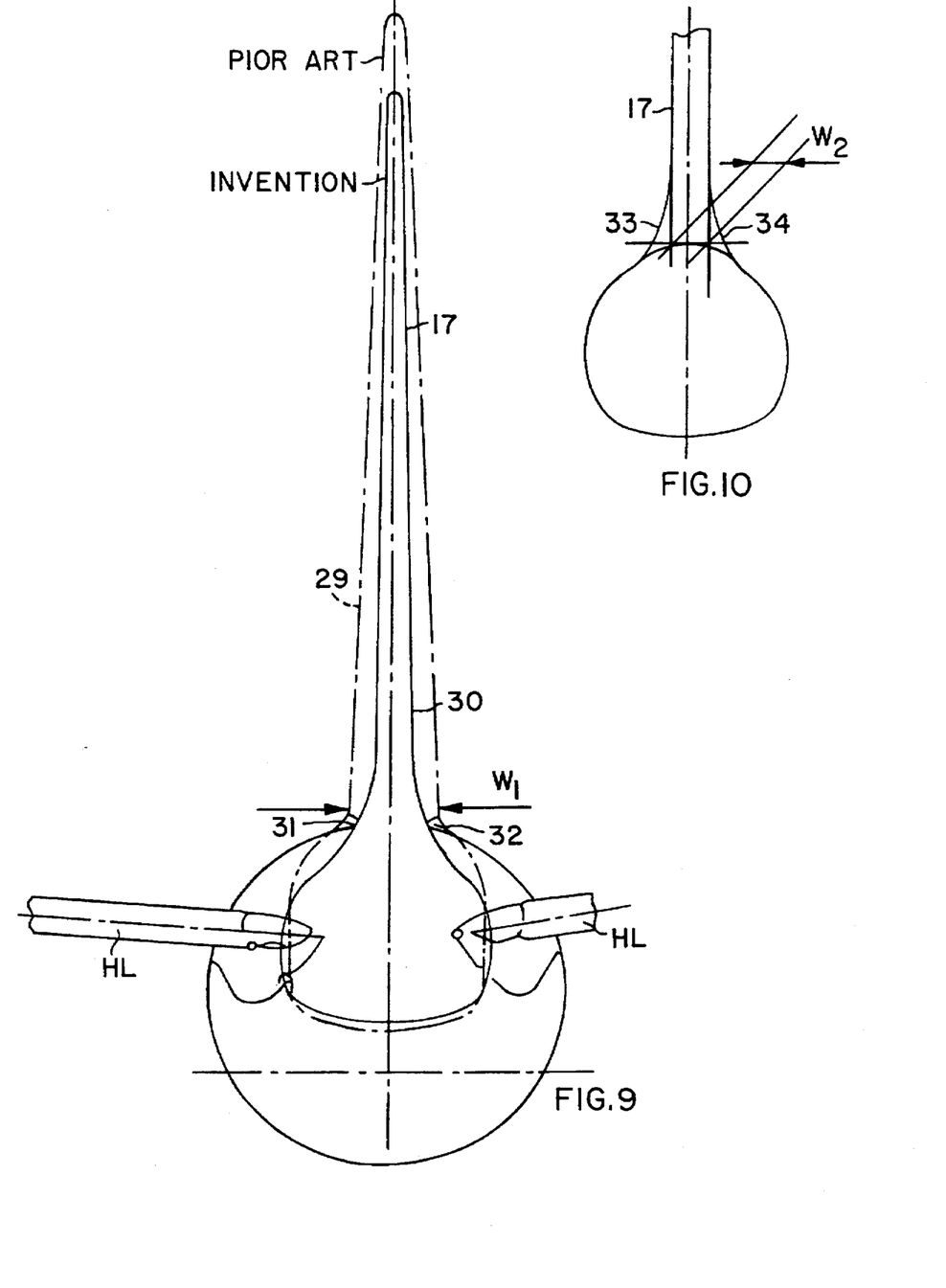
FIG. 9 is a forward view toward the tail unit for comparing the transition between the rudder assembly and the tail section in a conventional tail unit (dashed line) with the respective transition in a tail unit according to the invention (full line)
FIG. 10 is a view similar to that of FIG. 9 illustrating the slenderizing effect for the transition between a rudder assembly and the tail section according to the invention.

FIG. 9 compares a transition or root fillet between the aircraft body and the rudder assembly in a conventional tail unit 1 with a respective transition or root fillet in a tail unit 16 according to the invention. The conventional rudder fin and tail cross-section is shown by a dash-dotted line 29. The rudder fin and tail cross-section according to the invention is shown by a full line 30. According to the invention the rudder assembly 17 has a relatively narrow width throughout and in the transition area the width W2 is substantially narrower as shown in FIG. 10 compared to the width W1 of a conventional rudder assembly shown in FIG. 9. This slimmed down rudder assembly 17 construction according to the invention is possible due to the intentional coupling of the rudder assembly 17 with the structure of the elevator assemblies HL, and due to the reduced sweepback of the rudder assembly. These features make sure that the above mentioned interference drag can be kept low. The transition is formed in both instances by a concave gusset covered by hardware covers 31 and 32 in the conventional unit as shown in FIG. 9 and by covers 33 and 34 as shown in FIG. 10 for the present tail unit 16. As shown in FIG. 10 the root width W2 amounts to about ⅓ of the root width W1 shown in FIG. 9 for the conventional unit. The covers 31 and 32 in the transition area of the conventional unit are substantially more sharp angled than the smooth transition covers 33 and 34 achieved according to the invention. Further, according to the invention, the present transition covers 33 and 34 are constructed as load supporting structures to thereby compensate for the relatively slimmed down cross-sectional area of the rudder assembly 17 according to the invention.

Although the invention has been described with reference to specific example embodiments, it will be appreciated that it is intended to cover all modifications and equivalents within the scope of the appended claims.

What is claimed is:

1. A tail construction for an aircraft having a fuselage with a tail tip, said tail construction comprising a tail section (16) secured to said fuselage (F), said tail section (16) forming a transition between said fuselage and said tail tip, an elevator assembly (HL) including a trimmable tailplane, a first connection securing said elevator assembly (HL) to said tail section (16), a rudder assembly (17), a second connection securing said rudder assembly to said tail section, said tail section comprising at least an upper contour line (KO) and two lateral contour lines (KR and KL), each of said contour lines (KO, KR, KL) comprising a respective curvature reversing point (URP, RRP, and LRP) positioned within an area of said first and second connections for reducing an axial length of said tail section and for displacing flow separation toward said tail tip.

2. The tail construction of claim 1, wherein said tail section (16) comprises ribs (20, 22) supporting said rudder assembly, and said elevator assembly comprises a center box structure (23) passing through said fuselage tail section in the area of said ribs (20, 22).

3. The tail construction of claim 2, further comprising a tubular stiffening member (26) arranged crosswise in said tail section (16) and a tilting element (27), said tilting element (27) and said center box structure (23) being mounted to said tubular stiffening member (26).

4. The tail construction of claim 3, further comprising slide bearings, wherein said tilting element (27) is mounted by said slide bearings inside said tubular stiffening member (26).

5. The tail construction of claim 3, further comprising roller bearings or ball bearings wherein said tilting element (27) is mounted in said tubular stiffening member (26) by said roller bearings or ball bearings.

6. The tail construction of claim 1, wherein a function curve representing a normalized cross-sectional area ($A/A_{max}$) of said tail section (16) at cross-sections along the length of said tail section (16) comprises a curvature reversal point at a normalized length x/l of said tail section in the range of 0.5<x/l<0.7, measured from a forward end of said tail section (16) toward said tail tip of said tail section.

7. The tail construction of claim 1, wherein a function curve representing a normalized circumference $U/U_{max}$ of said tail section (16) at cross-sections along the length of said tail section comprises a curvature reversal point at a normalized length x/l of said tail section in the range of 0.5<x/l<0.7, measured from a forward end of said tail section toward said tail tip of said tail section.

8. The tail construction of claim 1, further comprising a load-supporting transition structure (33, 34) between said rudder assembly and said tail section.

9. The tail construction of claim 2, wherein said ribs (20, 22) have a shape in a cross-sectional plane of said tail section, which shape has a flattened configuration on the underside of said fuselage tail section approximating a straight line at least near a central vertical longitudinal plane of said fuselage tail section.

* * * * *